US012625062B2

(12) United States Patent (10) Patent No.: US 12,625,062 B2
Shin et al. (45) Date of Patent: May 12, 2026

(54) METHOD FOR EVALUATING ADHESION OF SEPARATOR

(71) Applicant: LG ENERGY SOLUTION, LTD., Seoul (KR)

(72) Inventors: Hyun Kyung Shin, Daejeon (KR); Jae Woong Yoo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 223 days.

(21) Appl. No.: 18/282,952

(22) PCT Filed: Nov. 1, 2022

(86) PCT No.: PCT/KR2022/016936
§ 371 (c)(1),
(2) Date: Sep. 19, 2023

(87) PCT Pub. No.: WO2023/090693
PCT Pub. Date: May 25, 2023

(65) Prior Publication Data
US 2024/0159653 A1 May 16, 2024

(30) Foreign Application Priority Data
Nov. 19, 2021 (KR) ........................ 10-2021-0160462

(51) Int. Cl.
*G01N 19/04* (2006.01)
*H01M 50/46* (2021.01)
(52) U.S. Cl.
CPC ............ *G01N 19/04* (2013.01); *H01M 50/46* (2021.01)
(58) Field of Classification Search
CPC ...... G01N 19/04; H01M 50/46; H01M 10/04; H01M 10/4285; H01M 50/461;
(Continued)

(56) References Cited

U.S. PATENT DOCUMENTS 4,893,503 A 1/1990 Kimura et al.
2003/0068523 A1 4/2003 Kaneta et al.
(Continued)

FOREIGN PATENT DOCUMENTS

CN 104596923 A 5/2015
CN 106769845 A 5/2017
(Continued)

OTHER PUBLICATIONS

Extended European Search Report issued on Aug. 16, 2024 in European Patent Application No. 22 895 900.3.
(Continued)

*Primary Examiner* — Robert R Raevis
(74) *Attorney, Agent, or Firm* — Morgan, Lewis & Bockius LLP

(57) ABSTRACT

A method for evaluating an adhesive strength of a separator including manufacturing an electrode-separator composite including an electrode stacked on at least one surface of a separator, and the at least one surface of the separator and a surface of the electrode facing the at least one surface include adhesive surfaces and non-adhesive surfaces, and the adhesive surfaces and the non-adhesive surfaces are alternately disposed; moving the electrode-separator composite; cutting the electrode-separator composite in a direction parallel to the moving direction; attaching measuring rolls respectively to both surfaces of the cut electrode-separator composite; separating the electrode-separator composite by rotating each of the attached measuring rolls and spacing the measuring rolls apart from each other; and measuring a torque generated by the measuring rolls while separating the electrode-separator composite.

20 Claims, 6 Drawing Sheets

[LAMINATION PROCESS] [CUTTING PROCESS] [MEASUREMENT PROCESS]

(58) Field of Classification Search
      CPC ......... G01L 5/0042; G01L 3/00; Y02E 60/10;
                                                      Y02P 70/50
      USPC ....... 73/1.11, 7.88, 827, 834, 835, 842, 845,
                                    73/848, 150 A; 228/103, 104, 58
      See application file for complete search history.

(56)                    References Cited

U.S. PATENT DOCUMENTS

| | | |
|---|---|---|
| 2009/0266174 A1 | 10/2009 | Kawabe et al. |
| 2019/0027777 A1 | 1/2019 | Lee et al. |
| 2021/0098847 A1 | 4/2021 | Jeong et al. |

FOREIGN PATENT DOCUMENTS

| | | |
|---|---|---|
| CN | 109870353 A | 6/2019 |
| EP | 1237215 A2 | 9/2002 |
| FR | 3028313 A1 | 5/2016 |
| JP | 04-177146 A | 6/1992 |
| JP | 1992-0328447 A | 11/1992 |
| JP | 2002-0005817 A | 1/2002 |
| JP | 2003-035658 A | 2/2003 |
| JP | 2009-0210463 A | 9/2009 |
| JP | 4960032 B2 | 6/2012 |
| JP | 2013-062139 A | 4/2013 |
| JP | 2021-148482 A | 9/2021 |
| KR | 10-1664945 B1 | 10/2016 |
| KR | 10-2018-0039561 A | 4/2018 |
| KR | 10-2018-0115053 A | 10/2018 |
| KR | 10-1965830 B1 | 4/2019 |
| KR | 10-2020-0027693 A | 3/2020 |
| KR | 10-2020-0107602 A | 9/2020 |
| KR | 10-2021-0049297 A | 5/2021 |
| KR | 10-2254354 B1 | 5/2021 |
| KR | 10-2364467 B1 | 2/2022 |

OTHER PUBLICATIONS

International Search Report and Written Opinion dated Feb. 24, 2023, issued in corresponding International Patent Application No. PCT/KR2022/016936.

Office Action issued in corresponding Japanese Patent Application No. 2023-556839, dated Sep. 17, 2024. (Note: JP 2013-062139 A and JP 2021-148482 A were previously cited).

Office Action dated Mar. 23, 2026 issued in the corresponding Chinese Patent Application No. 202280024968.0 with the English translation. (Note: JP 2021-148482 already submitted.).

[LAMINATION PROCESS]    [CUTTING PROCESS]    [MEASUREMENT PROCESS]

[FIG. 6]
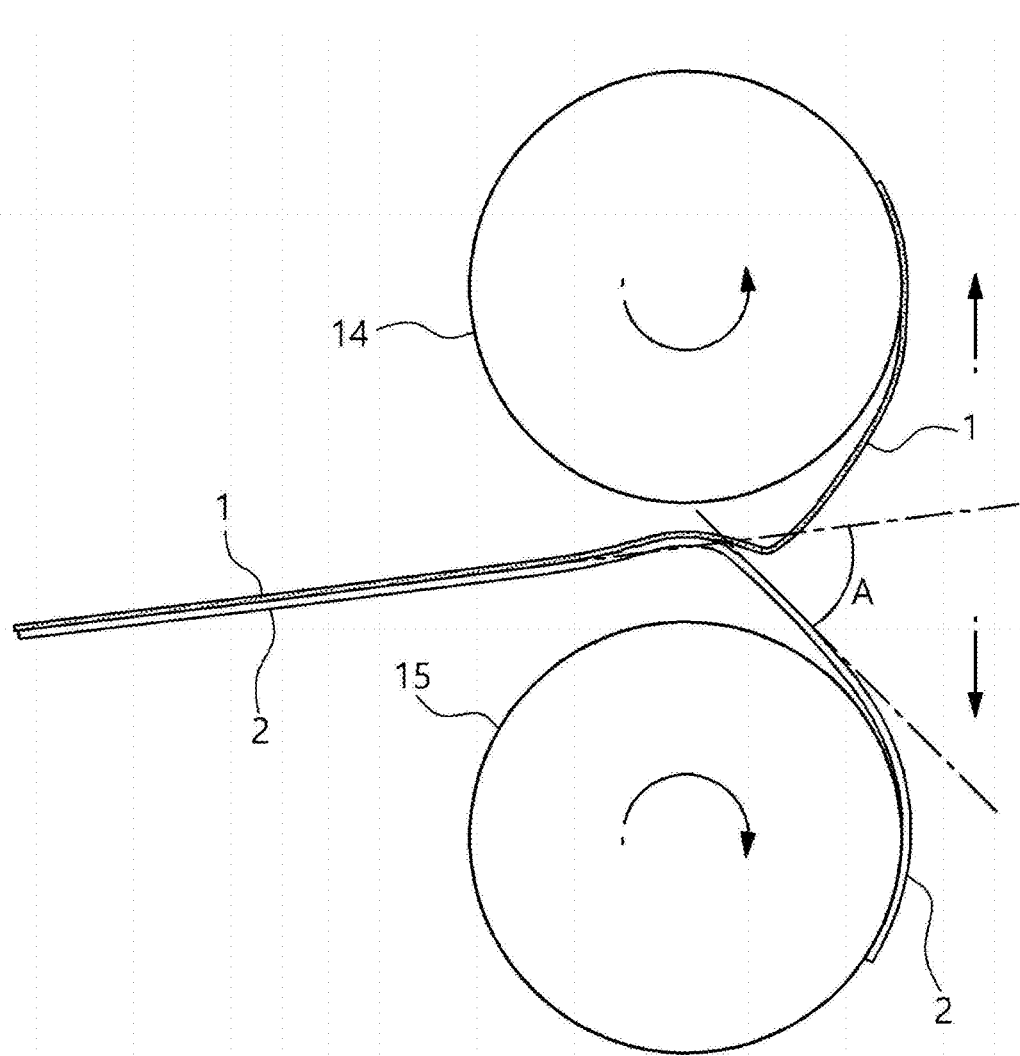

METHOD FOR EVALUATING ADHESION OF SEPARATOR

TECHNICAL FIELD

This application claims priority to and the benefit of Korean Patent Application No. 10-2021-0160462 filed with the Korean Intellectual Property Office on Nov. 19, 2021, the entire contents of which are incorporated herein by reference.

The present application relates to a method for evaluating an adhesive strength of a separator.

BACKGROUND ART

The demand for secondary batteries such as electric vehicles and mobile devices is rapidly expanding, and there is an increasing need for the condition diagnosis and the quality stability of the secondary batteries.

The secondary batteries may be divided into a nickel-cadmium battery, a nickel-metal hydride battery, a nickel-hydrogen battery, and a lithium secondary battery. Among the above-described secondary batteries, the lithium secondary battery has a higher operating voltage than the nickel-cadmium battery or nickel-metal hydride battery, and have an excellent characteristics of energy density per unit weight, such that they are mainly used in portable electronic devices or high-output hybrid vehicles.

In general, the lithium secondary battery may include an electrode assembly having a positive electrode, a negative electrode, and a separator, electrode tabs extending from the electrode assembly, and electrode leads welded to the electrode tabs. In this case, the electrode assembly is a power generating element in which positive and negative electrodes are stacked with the separator interposed therebetween. In general, the electrode assembly is manufactured using a method in which the negative electrode, separator, and positive electrode are respectively manufactured in a separate process, and then laminated and adhered by applying heat and pressure at the same time. However, in the case of a high-capacity battery, the separator containing a less binder, that is, the thin separator with a low binder content, is often applied. For this reason, when the battery is manufactured in the above-mentioned method, there is a problem in that a sufficient adhesive strength is not secured between the electrode and the separator.

Therefore, it is important to use the separator with an excellent adhesive strength to secure a sufficient adhesive strength. To this end, it is important to evaluate the adhesive strength of the separator. In the related art, as illustrated in FIG. 2, in order to evaluate the adhesive strength of the separator, a method for evaluating the adhesive strength in which a specimen of the separator and electrode manufactured by applying heat and pressure is prepared and a peel test is performed on the manufactured specimen is generally used.

Specifically, the peel test is performed as illustrated in FIG. 2. A separator 1 with a width of 25 mm and a length of 60 mm and an electrode 2 are stacked, placed between a polyethylene terephthalate (PET) film 3, and pressed with a heated press. Thereby, an electrode-separator composite in which an adhesive strength is generated between the separator and the electrode is manufactured (FIG. 2A). A slide glass 6 is attached using a double-sided adhesive tape 5 to an electrode surface of the electrode-separator composite manufactured as described above, and the PET film is attached using a single-sided adhesive tape 4 to a partial region of a separator surface of the electrode-separator composite, resulting in manufacturing the specimen (FIG. 2B). The specimen manufactured as described above is mounted on a universal material testing machine and a force required to separate the separator and the electrode is measured (FIG. 2C).

In this case, since the adhesive strength of the separator greatly fluctuates depending on a position, it is necessary to evaluate the adhesive strength by attaching the PET film to various positions on the separator surface of the electrode-separator composite. However, it takes a large amount of time to make several specimens and measure each one. Because of the above-mentioned restriction, there is a problem in that the evaluation (sampling inspection) of the adhesive strength of the separator is not sufficiently achieved.

Therefore, there is a need for a new method for evaluating an adhesive strength of a separator which is capable of overcoming the above-described problem.

DOCUMENT OF RELATED ART

Korean Patent Publication No. 10-2016-0023072

DETAILED DESCRIPTION OF THE INVENTION

Technical Problem

The present application has been made in an effort to provide a method capable of efficiently performing an evaluation of an adhesive strength of a separator over a large region.

Technical Solution

An exemplary embodiment of the present disclosure provides a method for evaluating an adhesive strength of a separator, the method including: manufacturing an electrode-separator composite in which an electrode is stacked on at least one surface of a separator, and surfaces of the separator and the electrode facing each other include adhesive surfaces and non-adhesive surfaces of the separator and the electrode, and the adhesive surfaces and the non-adhesive surfaces are alternately disposed; moving the electrode-separator composite; cutting the electrode-separator composite in a direction parallel to the moving direction; attaching measuring rolls respectively to both surfaces of the cut electrode-separator composite; separating the electrode-separator composite by rotating each of the attached measuring rolls and spacing the measuring rolls apart from each other; and measuring a torque generated by the measuring rolls while separating the electrode-separator composite.

Advantageous Effects

A method for evaluating an adhesive strength of a separator according to an exemplary embodiment of the present application may reduce the time required for the evaluation.

A method for evaluating an adhesive strength of a separator according to an exemplary embodiment of the present application may continuously evaluate the adhesive strength of the separator, thereby reducing the possibility of occurring failure in the process.

A method for evaluating an adhesive strength of a separator according to an exemplary embodiment of the present application may often and easily perform the evaluation, thereby efficiently controlling the process.

BRIEF DESCRIPTION OF DRAWINGS

FIG. 6 is an enlarged view illustrating the measurement process according to the exemplary embodiment of the method for evaluating the adhesive strength of the separator of the present application.

EXPLANATION OF REFERENCE NUMERALS AND SYMBOLS

Figure 1A:
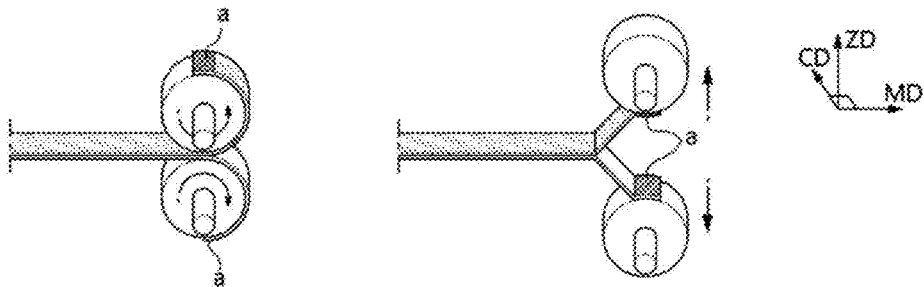
FIGS. 1A and 1B are side views illustrating exemplary embodiments of a method for evaluating of an adhesive strength of a separator according to the present application.

1: Separator
2: Electrode
3: PET film
4: Single-sided adhesive tape
5: Double-sided adhesive tape
6: Slide glass
10, 11: Lamination roll
12, 13: Cutting roll
14(14-1, 14-2, 14-3), 15(15-1, 15-2, 15-3): Measuring roll
a: Fixed portion

BEST MODE

Hereinafter, exemplary embodiments of the present disclosure will be described in detail so that those with ordinary skill in the art to which the present disclosure pertains may easily carry out the exemplary embodiments. However, the present disclosure may be implemented in various different ways and is not limited to the embodiments described herein.

Throughout the specification, unless explicitly described to the contrary, the word "comprise" or "include" and variations, such as "comprises," "comprising," "includes," or "including", means the further inclusion of stated constituent elements, not the exclusion of any other constituent elements.

In the present specification, the term 'adhesion' means a method of respectively manufacturing a negative electrode, a separator, and a positive electrode in a separate process, and then stacking the separator and the negative electrode and/or positive electrode, and simultaneously applying heat and pressure. The term 'adhesion' is also called a 'lamination'.

In the present specification, the term 'adhesive surface' means a portion in which the adhesion is made, and the term 'non-adhesive surface' means a portion in which the adhesion is not made.

A method for evaluating an adhesive strength of a separator according to an exemplary embodiment of the present disclosure may include: manufacturing an electrode-separator composite in which an electrode is stacked on at least one surface of a separator, and surfaces of the separator and the electrode facing each other include an adhesive surface and a non-adhesive surface of the separator and the electrode, and the adhesive surface and the non-adhesive surface are alternately disposed; moving the electrode-separator composite; cutting the electrode-separator composite in a direction parallel to the moving direction; attaching measuring rolls respectively to both surfaces of the cut electrode-separator composite; separating the electrode-separator composite by rotating each of the attached measuring rolls and spacing the measuring rolls apart from each other; and measuring a torque generated by the measuring rolls while separating the electrode-separator composite.

In the exemplary embodiment of the present disclosure, the manufacturing of the electrode-separator composite in which the electrode is stacked on at least one surface of the separator, and the surfaces of the separator and the electrode facing each other include the adhesive surface and the non-adhesive surface of the separator and the electrode, and the adhesive surface and the non-adhesive surface are alternately disposed, may include: manufacturing a laminate by stacking the electrode on at least one surface of the separator; and heating and pressurizing only a partial region of the laminate, in which the partial region may correspond to the adhesive surface of the electrode-separator composite.

That is, the heating and pressurizing of only the partial region of the laminate corresponding to the adhesive surface of the electrode-separator composite may heat and pressurize the partial region so that the adhesive surface is formed at a predetermined interval.

In the present specification, the 'predetermined interval' means that a distance from one specific position to another specific position is not only the same, but also different from each other.

In the present specification, the 'distance' means the shortest length from one specific position to another specific position.

In the exemplary embodiment of the present disclosure, the distance between the adhesive surfaces may be the same.

In the exemplary embodiment of the present disclosure, the distance between the adhesive surfaces may be different.

In the exemplary embodiment of the present disclosure, the manufacturing of the laminate by stacking the electrode on at least one surface of the separator and the heating and pressurizing of only the partial region of the laminate may be performed simultaneously using a lamination roll including a spaced pattern.

In the exemplary embodiment of the present disclosure, the adhesive surface may be formed in a stripe shape in a direction parallel to a rotating axis of the measuring roll.

In the present specification, the 'lamination roll' is a device for manufacturing the electrode-separator composite by adhering the separator to at least one surface of the electrode, and while the separator and the electrode are passing through the lamination roll, laminating, heating, and pressurizing of the separator and the electrode may be simultaneously performed to manufacture the electrode-separator composite.

More specifically, the lamination roll may have a pattern with a predetermined interval, and while the separator and electrode pass through the two lamination rolls, laminating, heating, and pressurizing of the separator and electrode may be performed simultaneously, such that the separator and electrode may be adhered. In this case, only a portion corresponding to a region having the pattern may be heated and pressurized to manufacture the electrode-separator composite in which the adhesive and non-adhesive surfaces of the separator and electrode are alternately disposed.

Figure 3:
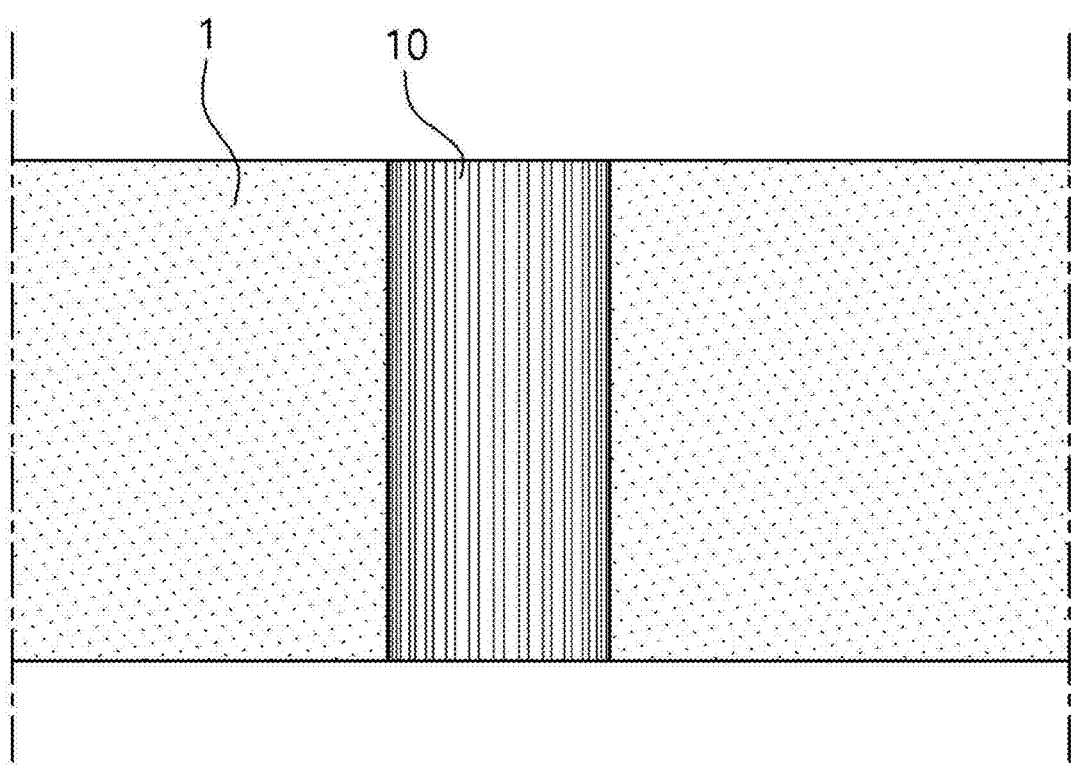
FIG. 3 is a top plan view illustrating a lamination process according to the method for evaluating the adhesive strength of the separator of the present application.

In this regard, FIG. 3 is a top plan view illustrating a lamination process for the method for evaluating the adhesive strength of the separator according to the present disclosure. While the separator 1 and the electrode 2 are supplied between lamination rolls 10 and 11, the electrode is stacked on at least one surface of the separator, heated and pressurized to form the electrode-separator composite in which the adhesive and non-adhesive surfaces of the separator and electrode are alternately disposed. The adhesive and non-adhesive surfaces may be formed alternately in accordance with a shape of the pattern formed in the lamination rolls (the adhesive and non-adhesive surfaces and some configurations are not illustrated).

By the above-described process, the adhesive and non-adhesive surfaces are alternatively disposed in the electrode-separator composite, in which the adhesive surfaces of the separator and electrode are adhered in a stripe shape in a direction parallel to the rotating axis of the measuring roll, which is defined herein as 'pattern lamination' in the present specification.

That is, in the present specification, the adhesive surfaces of the separator and electrode are adhered so as to form a stripe shape in a direction parallel to the rotating axis of the measuring roll, which may be defined herein as the pattern lamination.

When the electrode-separator composite is manufactured by the pattern lamination, the electrode-separator composite having a plurality of adhesive surfaces at a predetermined interval may be manufactured. Therefore, a torque measured when a portion (non-adhesive surfaces) where the adhesive strength is not made is opened may be used as the basis for zero-point adjustment, such that there is an advantage that the measuring of the adhesive strength of the separator may be often performed.

In the exemplary embodiment of the present disclosure, the heating and pressurizing of only the partial region of the laminate may heat and pressurize the partial region of the laminate at a temperature of 60° C. to 120° C. and a pressure of 10 kgf/cm$^2$ to 100 kgf/cm$^2$. Preferably, the heating and pressurizing of only the partial region of the laminate may heat and pressurize the partial region of the laminate at a temperature of 70° C. to 110° C. and a pressure of 20 kgf/cm$^2$ to 80 kgf/cm$^2$.

In the exemplary embodiment of the present disclosure, the heating may be performed at a temperature of 60° C. to 120° C., preferably 70° C. to 110° C.

In the exemplary embodiment of the present disclosure, the pressurizing may be performed at a pressure of 10 kgf/cm$^2$ to 100 kgf/cm$^2$, preferably at a pressure of 20 kgf/cm$^2$ to 80 kgf/cm$^2$.

When the above-described temperature and pressure conditions are satisfied, the separator may be prevented from being deformed due to heat or pressure, thereby enabling a stable adhesion.

In the present specification, the 'measuring roll' means a device for applying a force respectively to the electrode and separator which are separated from the electrode-separator composite for evaluating the adhesive strength of the separator.

In the exemplary embodiment of the present application, the attaching of the measuring rolls to each of two surfaces of the cut electrode-separator composite may include: fixing a partial region of both surfaces of the electrode-separator composite with the measuring rolls; and rotating each measuring roll. The rotating of the measuring rolls in the attaching of the measuring rolls is to further ensure to fix the measuring rolls with the electrode-separator composite before separating the electrode-separator composite.

In the exemplary embodiment of the present application, the separating of the electrode-separator composite by rotating each of the attached measuring rolls and spacing the measuring rolls apart from each other may mean applying a force to the electrode-separator composite by each measuring roll.

That is, in the exemplary embodiment of the present application, the applying of the force to the electrode-separator composite by each measuring roll may include: spacing the measuring rolls attached to both surfaces of the electrode-separator composite apart in a vertical direction with respect to the moving direction of the electrode-separator composite while rotating the measuring rolls attached to both surfaces of the electrode-separator composite.

That is, as illustrated in FIG. 1A, the partial region of both surfaces of the electrode-separator composite are fixed (a: fixed portion) with the measuring rolls. After rotating the measuring rolls, the measuring rolls is spaced apart in the vertical direction with respect to the moving direction by applying the force to the electrode-separator composite, thereby separating the electrode-separator composite.

In the method for evaluating the adhesive strength of the separator according to the exemplary embodiment of the present application, the electrode-separator composite may be separated by rotating two measuring rolls and spacing the two measuring rolls apart from each other. The adhesive strength of the separator may be evaluated from a result of measuring the torque generated by the measuring rolls when the electrode-separator composite is separated. Therefore, it is possible that the adhesive strength of a plurality of separators is evaluated and the time in the process is reduced. In addition, it is possible to often and easily perform the evaluation, thereby efficiently controlling the process.

In the exemplary embodiment of the present disclosure, the electrode may be a positive or negative electrode, preferably a negative electrode.

In the exemplary embodiment of the present disclosure, the separator may be a safety reinforced separator (SRS) including a non-aqueous binder on a surface thereof.

In the exemplary embodiment of the present disclosure, the electrode is a negative electrode, and the separator may be the safety reinforced separator.

The safety reinforced separator may be the separator to which a method of coating ceramic particles and a polymer binder on the separator surface is applied, and may be the separator with reinforced durability and heat resistant. The polymer binder may be the non-aqueous binder.

The positive electrode may be manufactured using a positive electrode active material including metal oxide primary particle, in this case, a concave-convex structure may be formed on the positive electrode surface by the metal oxide primary particle. In this case, the non-aqueous binder of the safety reinforced separator surface may be physically coupled with the concave-convex structure formed on the positive electrode surface to implement high adhesive strength of the positive electrode-separator.

In contrast, since the negative electrode is manufactured using a negative electrode active material including carbon, it is relatively difficult to form the concave-convex structure on the negative electrode surface, therefore the adhesive strength of the positive electrode-separator is generally higher than the adhesive strength of the negative electrode-separator.

Therefore, it is relatively more important to evaluate the adhesive strength of the negative electrode.

In the exemplary embodiment of the present disclosure, the electrode may be in a shape of an electrode sheet. That is, the positive electrode may be a positive electrode sheet, and the negative electrode may be a negative electrode sheet. The electrode sheet may have a shape of an electrode plate of a specific or predetermined size by the cutting of the electrode-separator composite.

In the exemplary embodiment of the present disclosure, the positive electrode and the positive electrode sheet may be manufactured by a method for manufacturing the positive electrode sheet using the positive electrode active material which is well known in the art, for example, by a method in which the positive electrode sheet is mixed with a binder or the like to manufacture a positive electrode slurry and the manufactured positive electrode slurry is applied, rolled, and dried on a positive electrode current collector.

In this case, the positive electrode active material is not particularly limited if it is generally used for the positive electrode of the secondary battery in the art, but for example, lithium metal oxide ($LiMO_2$) in a layered structure such as lithium cobaltate ($LiCoO_2$) and a triatomic system, spinel material ($LiM_2O_4$) represented by lithium manganese oxide ($LiM_2O_4$), or olivine-based material ($LiMPO_4$) such as lithium iron phosphate ($LiFePO_4$) may be used. In addition, aluminum may be used as the positive electrode current collector.

In the exemplary embodiment of the present disclosure, the negative electrode and the negative electrode sheet may be manufactured by a method for manufacturing the negative electrode sheet using the negative electrode active material which is well known in the art, for example, by a method in which the negative electrode sheet is mixed with a binder or the like to manufacture a negative electrode slurry and the manufactured positive electrode slurry is subsequently applied, rolled, and dried on a negative electrode current collector.

In this case, the negative electrode active material is not particularly limited if it is generally used for the negative electrode of the secondary battery in the art, but for example, a carbon (C) based material, Si, Sn, tin oxide, composite tin alloys, transition metal oxide or lithium metal oxide, and the like may be used. In addition, copper or nickel may be used as the negative electrode current collector.

In the exemplary embodiment of the present disclosure, the binder is for improving the adhering force between the positive or negative active materials, and those well known in the art may be used without limitation, for example, polyvinylidene fluoride (PVDF), polytetrafluoroethylene (PTFE), cellulose, polyvinyl alcohol, carboxymethylcellulose (CMC), starch, hydroxypropyl cellulose, regenerated cellulose, polyvinylpyrrolidone, tetrafluoroethylene, polyethylene, polypropylene, EPDM rubber, sulfonated EPDM or styrene butadiene rubber (SBR) and the like may be used, but not limited thereto.

In the exemplary embodiment of the present disclosure, the positive electrode slurry or negative electrode slurry may further include a conductive material or a filler. Materials commonly used in the art may be used as the conductive material and the filler.

Specifically, carbon black such as Denka black, acetylene black, Ketjen black, furnace black, thermal black, etc., one or more types selected from a group consisting of natural graphite and artificial graphite may be used as the conductive material, but the conductive material is not limited thereto, and the conductive material which has conductivity without causing chemical changes in the constituted battery may be generally used.

In addition, one or more types selected from a group consisting of polyethylene, polypropylene, glass fiber, and carbon fiber may be used as the filler, but is not limited thereto, and a fibrous material which does not cause chemical changes in the constituted battery may be generally used as the filler.

In the exemplary embodiment of the present disclosure, a thickness of the positive electrode is 50 μm to 300 μm, preferably 100 μm to 200 μm, but not limited thereto.

In the exemplary embodiment of the present disclosure, a thickness of the negative electrode is 50 μm to 300 μm, preferably 100 μm to 200 μm, but not limited thereto.

Since a capacity of the negative electrode should be greater than that of the positive electrode, the thickness of the negative electrode is thicker than that of the positive electrode.

In the present specification, the thickness of the electrode may be measured by scanning a cross-section of the electrode using a Scanning Electron Microscope (SEM). In this case, the thickness of the electrode means the thickness including both the electrode current collector and the electrode active material layer.

In the exemplary embodiment of the present disclosure, the separator may be in a shape of a separator sheet. The separator sheet may have a separator shape of a specific or predetermined size by the cutting of the electrode-separator composite.

In the exemplary embodiment of the present disclosure, an olefin-based polymer, a sheet, a non-woven fabric, and kraft paper made of glass fiber, polyethylene, or the like may be used as the separator, and the olefin-based polymer may be preferably used.

More specifically, one or more types selected from a group consisting of high density polyethylene, low density polyethylene, linear low density polyethylene, ultra-high molecular weight polyethylene, polypropylene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, polyethylenenaphthalene and mixtures thereof may be used as the separator, but not limited thereto.

In the exemplary embodiment of the present disclosure, a thickness of the separator is 3 μm to 50 μm, preferably 10 μm to 30 μm, but not limited thereto.

In the present specification, the thickness of the separator may be measured by scanning a cross-section of the separator using SEM.

In the exemplary embodiment of the present disclosure, the cutting of the electrode-separator composite may be performed using a knife, a mold, scissors or a laser, but not limited thereto.

In the exemplary embodiment of the present disclosure, the cutting of the electrode-separator composite may be performed by a cutting roll.

Figure 4:
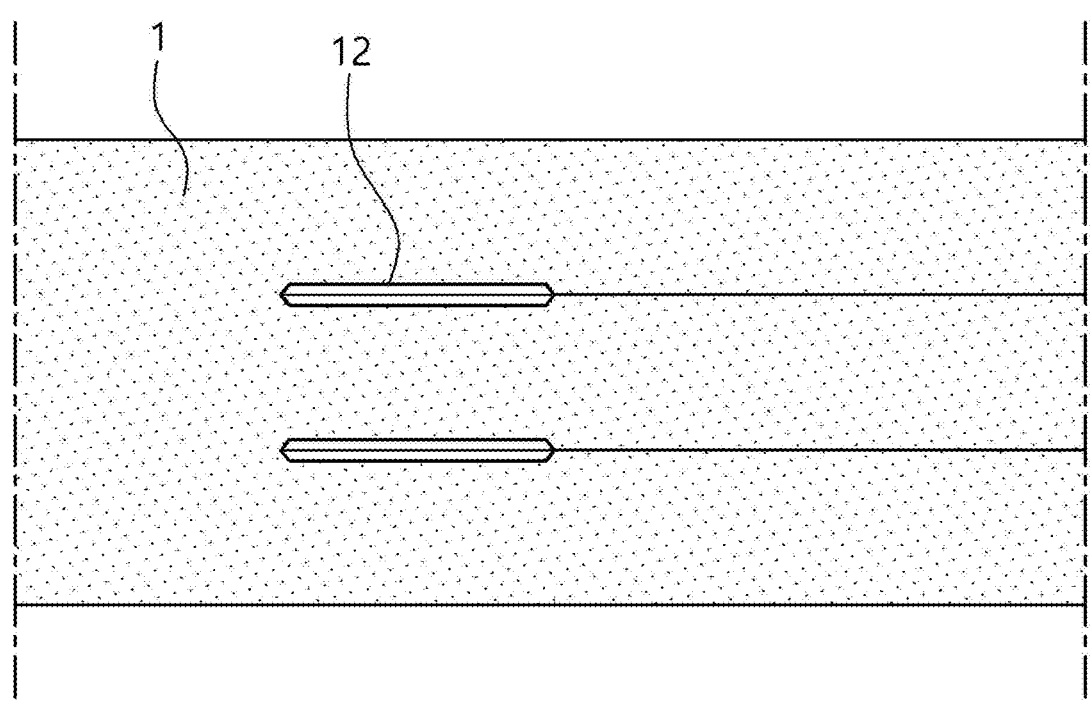
FIG. 4 is a top plan view illustrating a cutting process according to the method for evaluating the adhesive strength of the separator of the present application.

In this regard, FIG. 4 is a top plan view illustrating a cutting process of the method for evaluating the adhesive strength of the separator according to the present disclosure. While the separator 1 and the electrode 2 are supplied between the cutting rolls 12 and 13, the electrode is stacked on at least one surface of the separator, heated and pressurized, and subsequently the electrode-separator composite in which the adhesive and non-adhesive surfaces of the separator and electrode are alternately disposed passes through the cutting rolls, the electrode-separator composite may be cut in a direction parallel to the moving direction (the adhesive and non-adhesive surfaces and some configurations are not illustrated).

In the exemplary embodiment of the present disclosure, a distance between the cut portions in the cutting of the electrode-separator composite in the direction parallel to the moving direction may be equal.

In the exemplary embodiment of the present disclosure, a distance between portions which is cut in the cutting of the electrode-separator composite in the direction parallel to the moving direction may be different.

In the present specification, the 'cutting roll' is a device for cutting the electrode-separator composite.

In the exemplary embodiment of the present disclosure, the moving of the electrode-separator composite may be performed by a conveyor belt, but not limited thereto, all means for moving the electrode-separator composite in a predetermined direction may be used.

In the present specification, the direction in which the electrode-separator composite is moved may be referred to as a 'manufacturing direction'. That is, the cutting of the electrode-separator composite in the direction parallel to the moving direction means that the cutting of the electrode-separator composite cuts the electrode-separator composite at a predetermined interval parallel to the manufacturing direction (MD). As described above, it is possible to improve an accuracy of evaluating the adhesive strength by cutting the electrode-separator composite at a predetermined interval, and also to reduce the evaluating time of the adhesive strength by obtaining a plurality of electrode-separator composites capable of evaluating the adhesive strength.

In the exemplary embodiment of the present disclosure, the cutting of the electrode-separator composite in the direction parallel to the moving direction may be cutting the electrode-separator composite at a predetermined interval.

In the present specification, 'cutting the electrode-separator composite at a predetermined interval' means that a distance between one cutting surface of one electrode-separator composite which is cut parallel to the manufacturing direction (MD) and the opposite cutting surface thereof has a predetermined size (or length). In addition, the predetermined size (or length) means that a deviation of size (or length) is ±1 mm.

In the present specification, "the attaching of the measuring rolls to each of the two surfaces of the cut electrode-separator composite" means that the measuring rolls are in contact with each of both surfaces of the electrode-separator composite so that a predetermined force may be applied to both surfaces of the cut electrode-separator composite.

Figure 5:
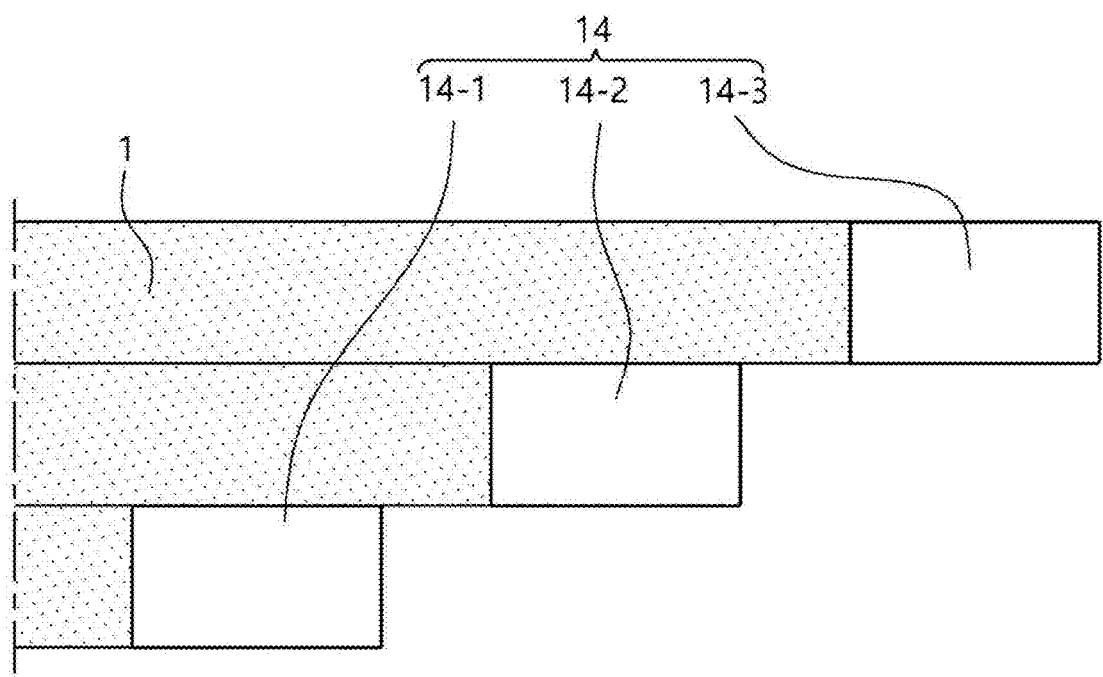
FIG. 5 is a top plan view illustrating a measurement process according to the method for evaluating the adhesive strength of the separator of the present application.

In this regard, FIG. 5 is a top plan view of a measurement process of the method for evaluating the adhesive strength of the separator according to the present disclosure. The measuring rolls 14 and 15 are attached to the electrode-separator composite which is cut in the direction parallel to the moving direction by the cutting rolls 12 and 13, and the evaluation of the adhesive strength of the separator is performed as described below (adhesive and non-adhesive surfaces and some configurations are not illustrated).

In the exemplary embodiment of the present disclosure, the measuring of the torque generated by the measuring rolls while separating the electrode-separator composite may use a torque sensor.

In the exemplary embodiment of the present disclosure, the measuring of the torque generated by the measuring rolls while separating the electrode-separator composite may include: measuring a torque generated by the measuring rolls when the non-adhesive surfaces in the electrode-separator composite are separated by the measuring rolls; determining the torque measured when the non-adhesive surfaces are separated by the measuring rolls as a reference for zero-point adjustment; and measuring a torque generated by the measuring rolls when the adhesive surfaces in the electrode-separator composite are separated by the measuring rolls. That is, the torque measured when portions (non-adhesive surfaces) in which the adhesive strength is not made in the electrode-composite are separated (or opened) is set to zero-point, and thereafter, the torque when portions in which the adhesive strength is made (adhesive surfaces) are separated (or opened) may be measured. The adhesive strength of the electrode-separator composite may be expressed as a specific value from the measured torque value, thereby evaluating the adhesive strength.

In the present specification, the meaning of "electrode-separator composite is separated" more specifically means that the electrode and separator of the electrode-separator composite are separated and opened as illustrated in FIG. 1A.

The method for evaluating the adhesive strength of the separator according to the exemplary embodiment of the present disclosure further includes obtaining the adhesive strength from the measured torque, in which the adhesive strength may be calculated by equation 1 below.

$$S = F/d \times \sin A \qquad \text{[Equation 1]}$$

In the equation 1 above,

S is an adhesive strength of a separator (unit: kgf),

F is a magnitude (unit: kgf·m) of a torque generated by measuring rolls while separating an electrode-separator composite (unit: kgf·m), d is the shortest distance between an electrode and a rotating axis of a measuring roll (unit: m)

A is an angle (unit: rad) formed by an electrode-separator composite and an electrode after separation.

In the present specification, "a magnitude of the torque generated by the measuring rolls while separating the electrode-separator composite" means a value measuring a torque generated by the measuring rolls using a torque sensor or the like. That is, it means a torque measured by the measuring rolls.

In the present specification, sin means trigonometric function, and sin A means the sin value of angle A (unit: radian).

The method for evaluating the adhesive strength of the separator according to the exemplary embodiment of the present disclosure may be to evaluate the adhesive strength of the electrode-separator composite from a difference between the adhesive strength calculated by Equation 1 when the non-adhesive surfaces in the electrode-separator composite are separated by the measuring rolls and the adhesive strength calculated by Equation 1 when the adhesive surfaces in the electrode-separator composite are separated by the measuring rolls.

The method for evaluating the adhesive strength of the separator according to the exemplary embodiment of the present disclosure may be performed by a roll-to-roll process. Therefore, the evaluation of the adhesive strength may be performed at one time by a continuous process.

Figure 1B:
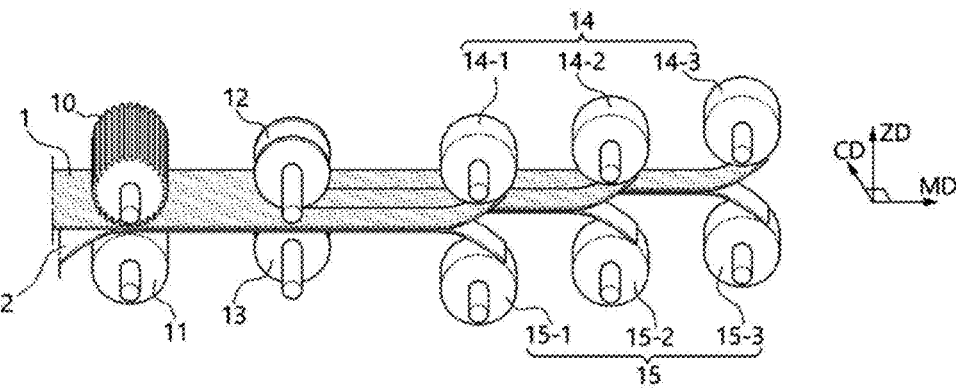
Figure 2A:
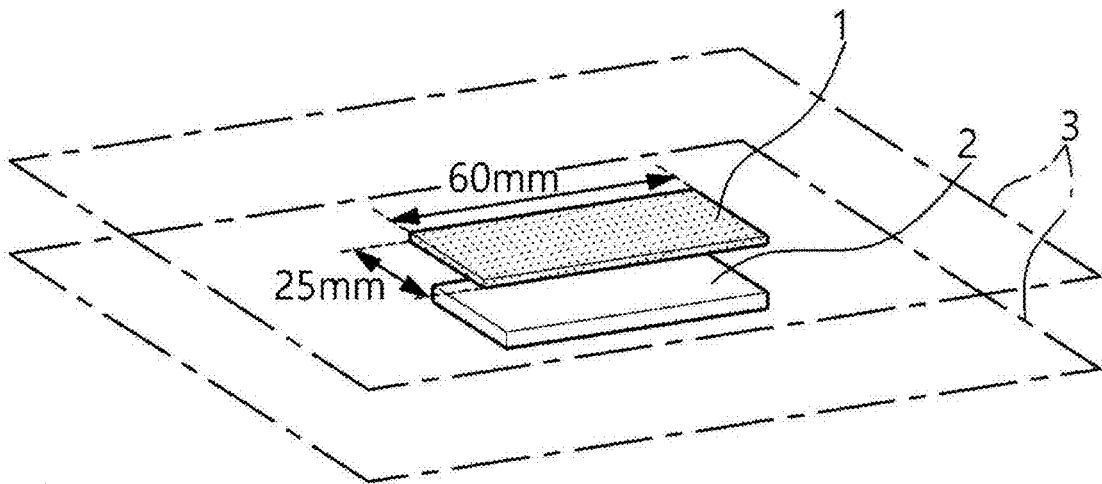
FIGS. 2A, 2B and 2C are views illustrating an embodiment of a method for evaluating an adhesive strength of a separator in the related art.
Figure 2B:
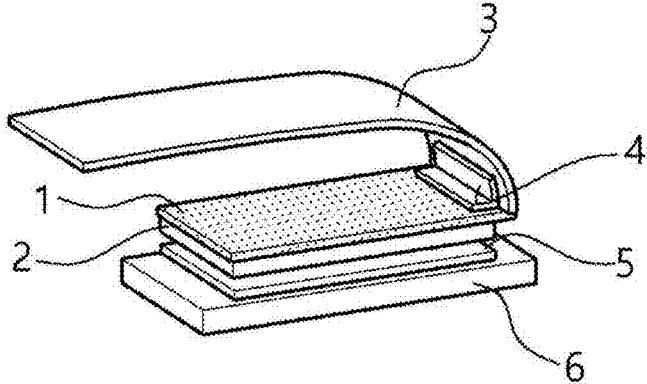
Figure 2C:
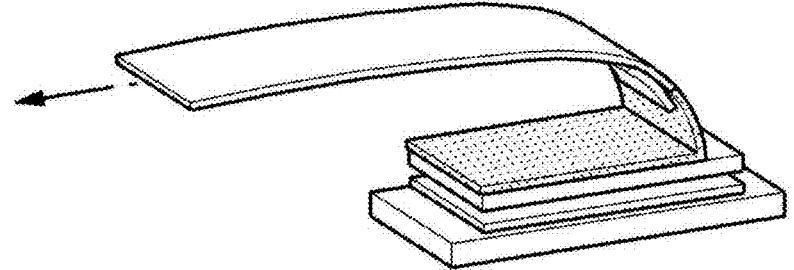

Specifically, as illustrated in FIG. 1B, the method for evaluating the adhesive strength of the separator of the present disclosure is performed as described below. First, a lamination process is performed, in which the separator 1 and the electrode 2 are supplied between two lamination rolls 10 and 11 with a predetermined pattern formed and the electrode is stacked on at least one surface of the separator and heated and pressurized to form the electrode-separator composite in which the adhesive and non-adhesive surfaces of the separator and electrode are alternatively disposed. In the lamination process, the process of stacking, heating and pressurizing may be performed together. That is, the electrode-separator composite is manufactured by the pattern lamination. Subsequently, the manufactured electrode-separator composite is supplied between the cutting rolls 12 and 13 and a cutting process is performed to cut the electrode-separator composite at a predetermined interval on the basis of the manufacturing direction (MD). Thereafter, the measuring rolls 14 and 15 are attached to both surfaces of the electrode-separator composite which is cut at the predetermined interval, and the electrode and separator are fixed to the measuring rolls, respectively, while each measuring roll rotates. Subsequently, while rotating and spacing the measuring rolls apart from each other, a force is applied to both surfaces of the electrode-separator composite, that is, to the separator and the electrode, respectively. Therefore, as the separation of the electrode-separator composite is performed, the electrode and the separator are detached, and the electrode-separator composite is opened.

In this case, the torque measured when the portions (non-adhesive surfaces) in which the adhesive strength is not made are separated (or opened) is set to zero-point, and thereafter, the torque when the portions in which the adhesive strength is made (adhesive surfaces) are separated (or opened) may be measured, thereby, evaluating the adhesive strength of the electrode-separator composite. More specifically, the adhesive strength is evaluated from the value of the difference between the adhesive strength calculated by Equation 1 when the non-adhesive surfaces in the electrode-separator composite are separated by the measuring rolls and the adhesive strength calculated by Equation 1 when the adhesive surfaces in the electrode-separator composite are separated by the measuring rolls. In this case, the process from the deformation by the measuring rolls 14 and 15 to the evaluation of the adhesive strength is defined as a measurement process.

In this case, the cutting rolls 12, 13, and measuring rolls may be applied in one or more pairs. For an example of FIG. 1B, the electrode-separator composite may be divided into three pieces by cutting the electrode-separator composite to have a predetermined interval by a pair of cutting rolls 12 and 13, and the measuring rolls 14 and 15 may be attached to each of the electrode-separator composites, thereby applying the evaluation of the adhesive strength. That is, three pairs of measuring rolls 14-1, 15-1, 14-2, 15-2, 14-3, and 15-3 may be used.

In addition, in FIGS. 1A and 1B, ZD corresponds to a thickness direction of material in a facility, MD means a direction parallel to the moving direction of material in the facility, that is, the manufacturing direction, and CD means a direction parallel to a width direction of material in the facility and perpendicular to the MD.

These processes may be performed at one time by the roll-to-roll process as described above.

According to the method for evaluating the adhesive strength of the separator of the exemplary embodiment of the present disclosure, as illustrated in FIG. 6, the electrode 2 is stacked on at least one surface of the separator 1, and surfaces of the separator and the electrode facing each other include the adhesive surfaces and non-adhesive surfaces of the separator and electrode, and when the electrode-separator composite in which the adhesive and non-adhesive surfaces of the separator 1 and electrode 2 are alternately disposed is separated by the measuring rolls 14 and 15, the torque sensed in the measuring roll 15 to which the electrode is attached by the torque sensor (not illustrated) is recorded in real time. In addition, the angle A formed by the electrode-separator composite and the electrode after separation is also recorded by a computer vision system (not illustrated).

The value measured from the record may be substituted into Equation 1 to obtain the adhesive strength of the separator in real time. That is, it is possible to continuously perform the evaluation of the adhesive strength of the separator at various positions of the electrode-separator composite. Therefore, according to the exemplary embodiment of the method for evaluating the adhesive strength of the separator of the present application, it is possible to obtain an advantageous effect of reducing the time required for the evaluation, reducing the possibility of defects occurring in the process, and also efficiently controlling the process.

While the embodiments of the present disclosure have been described above, the scope of the present disclosure is not limited to, and it will be obvious to those skilled in the art to which the present disclosure pertains that various modifications and alterations may be made without departing from the technical spirit of the present disclosure.

The invention claimed is:

1. A method for evaluating an adhesive strength of a separator that is configured to be disposed between a negative electrode of a battery and a positive electrode of the battery, the method comprising:
   manufacturing an electrode-separator composite including an electrode stacked on at least one surface of a separator, the at least one surface of the separator and a surface of the electrode facing the at least one surface including adhesive portions and non-adhesive portions, and the adhesive portions and the non-adhesive portions are alternately disposed;
   moving the electrode-separator composite;
   cutting the electrode-separator composite in a direction parallel to the moving direction;
   attaching measuring rolls respectively to both surfaces of the cut electrode-separator composite;
   separating the electrode-separator composite by rotating each of the attached measuring rolls and spacing the measuring rolls apart from each other; and
   measuring a torque generated by the measuring rolls while separating the electrode-separator composite.

2. The method of claim 1, wherein the manufacturing of the electrode-separator composite comprises:
   manufacturing a laminate by stacking the electrode on the at least one surface of the separator; and
   heating and pressurizing only a partial region of the laminate,
   wherein the partial region corresponds a region including the adhesive portions.

3. The method of claim 2, wherein the heating and pressurizing of only the partial region of the laminate includes heating and pressurizing the partial region at a temperature of 70° C. to 110° C. and a pressure of 20 kgf/cm² to 80 kgf/cm².

4. The method of claim 2, wherein the manufacturing of the laminate and the heating and pressurizing of only the partial region of the laminate are performed simultaneously utilizing lamination rolls including a spaced pattern.

5. The method of claim 4, wherein the lamination rolls have grooves on circumferential surfaces of the lamination rolls.

6. The method of claim 2, wherein the heating and pressurizing of only the partial region of the laminate includes heating and pressurizing the partial region at a temperature of 60° C. to 120° C. and a pressure of 10 kgf/cm² to 100 kgf/cm².

7. The method of claim 1, wherein at least one of the adhesive portions forms a stripe shape in a direction parallel to a rotating axis of a measuring roll among the measuring rolls.

8. The method of claim 1, wherein the measuring of the torque utilizes a torque sensor.

9. The method of claim 1, wherein the measuring of the torque comprises:

measuring a first torque generated by the measuring rolls in response to the non-adhesive portions being separated by the measuring rolls;

determining the measured first torque as a reference for zero-point adjustment; and measuring a second torque generated by the measuring rolls in response to the adhesive portions being separated by the measuring rolls.

10. The method of claim 1, further comprising:

obtaining an adhesive strength from the measured torque, wherein the adhesive strength is calculated by Equation 1 below:

$$S = F/d \times \sin A \qquad \text{[Equation 1]}$$

in the Equation 1:

S is an adhesive strength (unit: kgf) of the separator,

F is a magnitude (unit: kgf·m) of the measured torque generated by the measuring rolls while separating the electrode-separator composite, D is a shortest distance (unit: m) between the electrode and a rotating axis of at least one of the measuring rolls, and A is an angle (unit: rad) formed by the electrode-separator composite and the electrode after the separation.

11. The method of claim 10, wherein the manufacturing of the electrode-separator composite comprises:

manufacturing a laminate by stacking the electrode on the at least one surface of the separator; and heating and pressurizing only a partial region of the laminate, wherein the partial region corresponds a region including the adhesive portions.

12. The method of claim 11, wherein the manufacturing of the laminate and the heating and pressurizing of only the partial region of the laminate are performed simultaneously utilizing lamination rolls including a spaced pattern.

13. The method of claim 11, wherein the heating and pressurizing of only the partial region of the laminate includes heating and pressurizing the partial region at a temperature of 60° C. to 120° C. and a pressure of 10 kgf/cm² to 100 kgf/cm².

14. The method of claim 10, wherein at least one of the adhesive portions forms a stripe shape in a direction parallel to a rotating axis of a measuring roll among the measuring rolls.

15. The method of claim 10, wherein the measuring of the torque utilizes a torque sensor.

16. The method of claim 10, wherein the measuring of the torque comprises:

measuring a first torque generated by the measuring rolls in response to the non-adhesive portions being separated by the measuring rolls;

determining the measured first torque as a reference for zero-point adjustment; and measuring a second torque generated by the measuring rolls in response to the adhesive portions being separated by the measuring rolls.

17. The method of claim 10, wherein the obtaining of the adhesive strength from the measured torque includes evaluating the adhesive strength of the electrode-separator composite from a difference between a first adhesive strength calculated by the Equation 1 in response to the non-adhesive portions being separated by the measuring rolls and a second adhesive strength calculated by the Equation 1 in response to the adhesive portions being separated by the measuring rolls.

18. The method of claim 1, wherein a distance between the adhesive portions are the same.

19. The method of claim 1, wherein a distance between the adhesive portions are different.

20. The method of claim 1, wherein the measuring rolls include one or more pairs of measuring rolls, the one or more pairs of measuring rolls include a first measuring roll and a second measuring roll, the first measuring roll is attached to a first surface among the both surfaces of the cut electrode-separator composite, and the second measuring roll is attached to a second surface among the both surfaces of the cut electrode-separator composite.

\* \* \* \* \*